United States Patent
Lu et al.

(10) Patent No.: US 11,056,976 B2
(45) Date of Patent: Jul. 6, 2021

(54) COUNTER-BASED FREQUENCY HOPPING SWITCHING REGULATOR

(71) Applicant: Analog Devices International Unlimited Company, Limerick (IE)

(72) Inventors: Danzhu Lu, Shanghai (CN); Langyuan Wang, Shanghai (CN); Jie He, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/292,113

(22) Filed: Mar. 4, 2019

(65) Prior Publication Data

US 2020/0287464 A1    Sep. 10, 2020

(51) Int. Cl.
| | | |
|---|---|---|
| *H02M 3/158* | (2006.01) | |
| *H02M 3/157* | (2006.01) | |
| *H02M 1/08* | (2006.01) | |
| *H02M 1/00* | (2006.01) | |

(52) U.S. Cl.
CPC .......... *H02M 3/1588* (2013.01); *H02M 1/08* (2013.01); *H02M 3/157* (2013.01); *H02M 2001/0009* (2013.01)

(58) Field of Classification Search
CPC ............ H02M 3/00; H02M 3/02; H02M 3/04; H02M 3/10; H02M 3/135; H02M 3/139; H02M 3/142; H02M 3/155; H02M 3/156; H02M 3/1563; H02M 3/157; H02M 3/158; H02M 3/1588; H02M 1/08; H02M 1/14–15; H02M 1/44; H02M 2001/0009;

(Continued)

(56) References Cited

U.S. PATENT DOCUMENTS 7,177,166 B1    2/2007 Kris
7,486,060 B1    2/2009 Bennett
(Continued)

FOREIGN PATENT DOCUMENTS

CN    111654185 A    9/2020

OTHER PUBLICATIONS

"Unpublished U.S. Appl. No. 15/823,477, filed Nov. 27, 2017", 25 pgs.

*Primary Examiner* — Thienvu V Tran
*Assistant Examiner* — Carlos O Rivera-Perez
(74) *Attorney, Agent, or Firm* — Schwegman Lundberg & Woessner, P.A,

(57) ABSTRACT

This disclosure describes techniques for controlling switching regulator switching operations. The techniques include selecting a given one of a plurality of clock signals based on a control signal. The techniques further include generating, by the switching regulator, an output voltage from an input voltage by controlling one or more switches according to a switching frequency that corresponds to the selected given one of the plurality of clock signals. The techniques further include varying the switching frequency of the switching regulator by changing a value of the control signal, used to select the given one of the plurality of clock signals, according to a given one of a plurality of refresh rate control signals that corresponds to the selected given one of the plurality of clock signals having respective values that correspond to respective ones of the plurality of refresh rate control signals.

20 Claims, 7 Drawing Sheets

(58) Field of Classification Search
CPC . H02M 2001/0012; H02M 2001/0025; H02M 2001/0041
USPC ........ 323/222–226, 268, 271–275, 277, 280, 323/282–285, 288, 351; 363/123, 124, 363/41; 327/113–123, 144–153
See application file for complete search history.

(56) References Cited

U.S. PATENT DOCUMENTS

| | | | |
|---|---|---|---|
| 7,898,830 B1* | 3/2011 | Casey | H02M 1/36 363/49 |
| 8,737,449 B2 | 5/2014 | Bergervoet et al. | |
| 8,901,905 B2 | 12/2014 | Fayed et al. | |
| 9,680,375 B2 | 6/2017 | Yu et al. | |
| 2006/0002501 A1 | 1/2006 | Muller | |
| 2012/0194227 A1* | 8/2012 | Lin | H02M 1/44 327/113 |

* cited by examiner

COUNTER-BASED FREQUENCY HOPPING SWITCHING REGULATOR

FIELD OF THE DISCLOSURE

This document pertains generally, but not by way of limitation, to switching regulators, and more particularly, to varying a switching frequency of the switching regulators.

BACKGROUND

Switching regulators typically use one or more switches (e.g., transistors) for alternately opening and closing a current path through a reactive element such as an inductor according to a particular frequency. In operation, a DC voltage is applied across the inductor and electrical energy is transferred to a load connected to the inductor by alternately opening and closing the switches as a function of the frequency. The amount of electrical energy transferred to the load is a function of the frequency at which the switches are opened and closed. Switching regulators that generate an output voltage lower than an input voltage are termed buck or step-down converters, and those that generate an output voltage higher than the input voltage are termed boost or step-up converters. Switching regulators are widely used for powering electronic devices, particularly battery-powered devices, such as portable cellular phones, laptop computers, and other electronic systems in which efficient use of power is desirable.

SUMMARY OF THE DISCLOSURE

In some certain embodiments, system is provided that controls switching operations of a switching regulator, the system includes clock signal selection circuitry configured to select a given one of a plurality of clock signals based on a control signal; a switching regulator configured to generate an output voltage from an input voltage by controlling one or more switches according to a switching frequency that corresponds to the selected given one of the plurality of clock signals; and control circuitry configured to vary the switching frequency of the switching regulator by changing a value of the control signal, used by the clock signal selection circuitry to select the given one of the plurality of clock signals, according to a given one of a plurality of refresh rate control signals having respective values that correspond to respective ones of the plurality of clock signals.

In some implementations, the clock signal selection circuitry comprises a multiplexer having a plurality of clock signal inputs each coupled to receive a respective one of the plurality of clock signals and a control input coupled to receive the control signal, wherein the clock signal selection circuitry outputs one of the plurality of clock signals as the selected given one of the plurality of clock signals based on the control signal received at the control input.

In some implementations, the control circuitry comprises a plurality of counters configured to generate respective ones of the plurality of refresh rate control signals based on respective maximum count values, wherein a first counter of the plurality of counters has a first maximum count value corresponding to a first of the plurality of clock signals, and wherein a second counter of the plurality of counters has a second maximum count value corresponding to a second of the plurality of clock signals. The plurality of counters is configured to receive the selected given one of the plurality of clock signals and increment or decrement count values based on the received selected given one of the plurality of clock signals. The control circuitry is configured to change the value of the control signal in response to determining that a given one of the plurality of counters has reached the maximum count value of the given one of the plurality of counters. In some implementations, counter selection circuitry is provided that is configured to select, based on the control signal, between outputs of the plurality of counters to generate the control signal based on the selected output, the outputs of the plurality of counters being indicative of the respective counter having reached the respective maximum count value.

In some implementations, the control circuitry further comprises random number generator circuitry configured to generate a random or pseudorandom number in response to a selected one of the plurality of counters reaching the respective maximum count value. The random or pseudorandom number is represented by a plurality of bits, and wherein a most significant bit of the plurality of bits is provided to the clock signal selection circuitry as the control signal when the plurality of clock signals includes only two clock signals.

In some implementations, the control circuitry comprises a plurality of logic storage elements coupled to another selection circuit. A first of the plurality of logic storage elements is configured to output to the another selection circuit a first value of a first of the plurality of refresh rate control signals at an edge of the given one of the plurality of clock signals. A second of the plurality of logic storage elements is configured to output to the another selection circuit a second value of a second of the plurality of refresh rate control signals at the edge of the given one of the plurality of clock signals. The another selection circuit selects, as an output of the another selection circuit, between the first and second values based on the control signal, the control signal being generated based on the output of the another selection circuit. The control circuitry further comprises random number generator circuitry configured to generate a random or pseudorandom number based on the output of the another selection circuit, wherein the random or pseudorandom number is represented by a plurality of bits, and wherein a most significant bit of the plurality of bits is provided to the clock signal selection circuitry as the control signal.

In some implementations, the control circuitry comprises a logic storage element, another selection circuit, and random number generator circuitry. The another selection circuit is configured to select, as an output of the another selection circuit based on the control signal, between a first and a second of the plurality of refresh rate control signals. The output of the another selection circuit causes the random number generator circuitry to generate a random or pseudorandom number represented by a plurality of bits. The logic storage element is configured to receive a bit from the plurality of bits and output to the another selection circuit the received bit at an edge of the given one of the plurality of clock signals.

In some implementations, feedforward compensation circuitry is coupled to the switching regulator, the feedforward compensation circuitry being configured to apply current compensation based on the control signal. A value of the current compensation is based on a first frequency of a slowest one of the plurality of clock signals and a second frequency of another one of the plurality of clock signals. The feedforward compensation circuitry is configured to apply the current compensation when the given one of the plurality of clock signals that is selected is the slowest one of the plurality of clock signals and prevent applying the current compensation when the given one of the plurality of clock signals that is selected is the another one of the plurality of clock signals. In some implementations, the feedforward compensation circuitry includes a number of current sources that corresponds to a number of clock signals in the plurality of clock signals.

In some embodiments, a method for controlling switching operations of a switching regulator is provided. The method includes selecting a given one of a plurality of clock signals based on a control signal; generating, by the switching regulator, an output voltage from an input voltage by controlling one or more switches according to a switching frequency that corresponds to the selected given one of the plurality of clock signals; and varying the switching frequency of the switching regulator by changing a value of the control signal used to select the given one of the plurality of clock signals, according to a given one of a plurality of refresh rate control signals that corresponds to the selected given one of the plurality of clock signals having respective values that correspond to respective ones of the plurality of refresh rate control signals.

In some implementations, the method further includes generating respective ones of the plurality of refresh rate control signals based on respective maximum count values of a plurality of counters, wherein a first counter of the plurality of counters has a first maximum count value corresponding to a first of the plurality of clock signals, and wherein a second counter of the plurality of counters has a second maximum count value corresponding to a second of the plurality of clock signals.

In some implementations, the method further includes applying current compensation based on the control signal, such that the current compensation is applied when the given one of the plurality of clock signals that is selected is a slowest one of the plurality of clock signals and is prevented from being applied when the given one of the plurality of clock signals that is selected is a different one of the plurality of clock signals.

In some embodiments, an apparatus for controlling switching operations of a switching regulator is provided. The apparatus includes means for selecting a given one of a plurality of clock signals based on a control signal; means for generating an output voltage from an input voltage by controlling one or more switches according to a switching frequency that corresponds to the selected given one of the plurality of clock signals; and means for varying the switching frequency of the switching regulator by changing a value of the control signal, used to select the given one of the plurality of clock signals, according to a given one of a plurality of refresh rate control signals that corresponds to the selected given one of the plurality of clock signals having respective values that correspond to respective ones of the plurality of refresh rate control signals.

In some implementations, the apparatus further includes means for generating respective ones of the plurality of refresh rate control signals based on respective maximum count values of a plurality of counters, wherein a first counter of the plurality of counters has a first maximum count value corresponding to a first of the plurality of clock signals, and wherein a second counter of the plurality of counters has a second maximum count value corresponding to a second of the plurality of clock signals; and means for applying current compensation based on the control signal, such that the current compensation is applied when the given one of the plurality of clock signals that is selected is a slowest one of the plurality of clock signals and is prevented from being applied when the given one of the plurality of clock signals that is selected is a different one of the plurality of clock signals.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
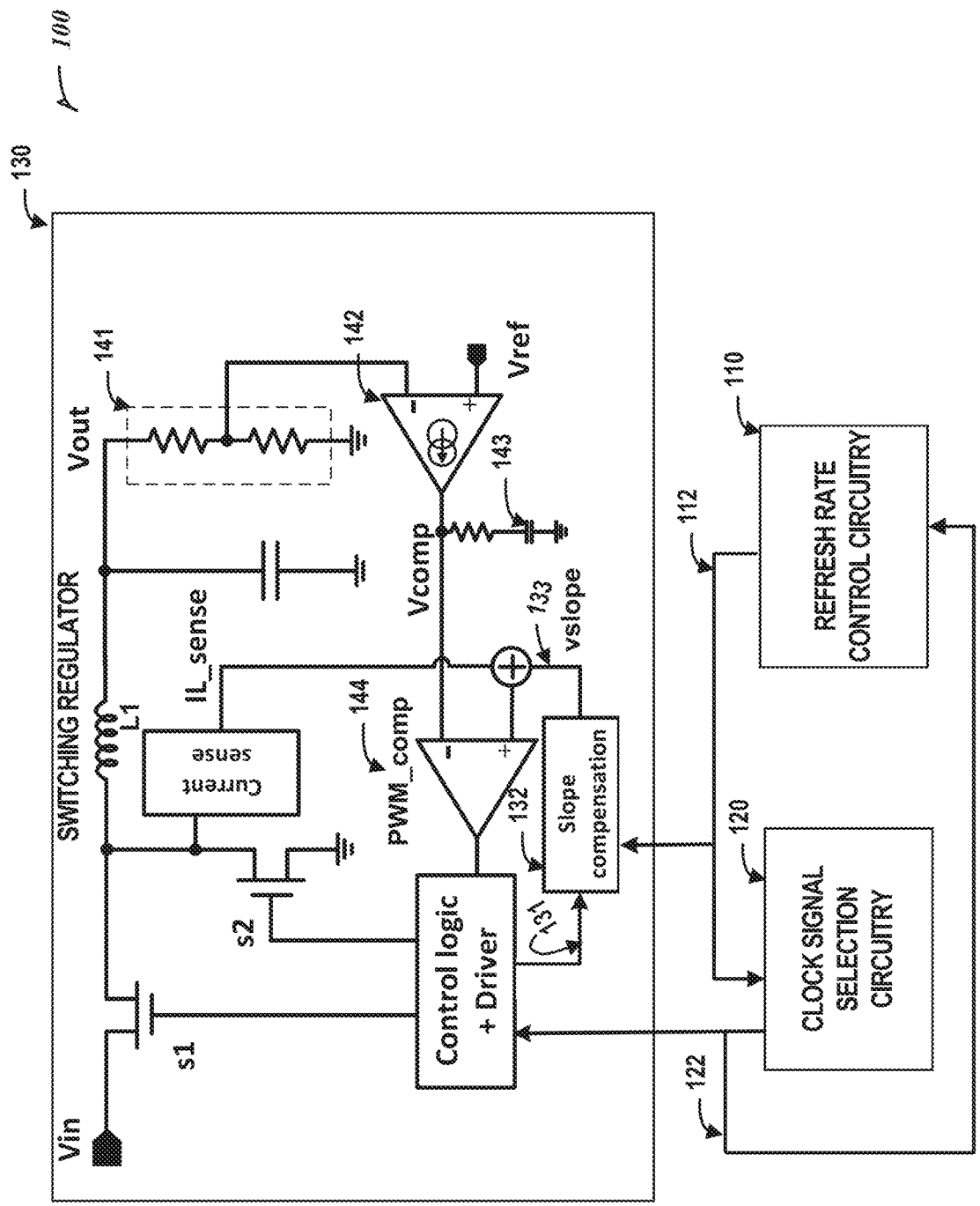
FIG. 1 is a block diagram of an example of a switching regulator system in accordance with various embodiments.

This disclosure describes, among other things, techniques to vary the switching frequency of a switching regulator, such as to reduce spurious noise produced by the switching regulator.

The output of switching regulators, due to periodic switching, typically contains voltage ripples with a frequency spectrum that contains concentrated energy at the switching frequency and its harmonics, i.e., spurs. In many cases, this spurious output noise interferes with the load and significantly degrades its performance.

One way to reduce the voltage ripples at the output of the switching regulators involves modifying the frequency of the switching regulators over time. Modifying the frequency of the regulator over time splits the power of each spur into smaller spurs, where the spur reduction is related to the number of frequencies that are used. While this approach may reduce the spurious noise that results from the periodic switching of the regulator, the duty-cycle disturbance associated with modifying the regulator's switching frequency produces transients and glitches that end up increasing the effective voltage ripple. One way to avoid production of the transients and glitches involves reducing the rate at which the frequency changes over time, but this in turn also requires increasing the number of available frequencies that are used. Increasing the number of frequencies introduces complications, cost and design complexities, and makes applying such a technique unsuitable for multiple channel power management integrated circuit applications.

Another way to reduce the voltage ripples at the output of the switching regulators involves modifying the frequency of the switching regulators using a counter. This technique uses a single counter to control a random number generator to switch between one or more frequencies used to drive the switching regulator. Specifically, a particular frequency signal is initially selected, and when the counter reaches a specified value, a random number generator is instructed to generate a new random number to choose another frequency signal. While this approach may reduce the spurious noise, determining the value of the counter suitable for all of the frequencies that are used is challenging. Namely, changing the frequency signal when the counter reaches the specified value may work well for reducing the spurious noise when a first frequency signal is used but may not reduce the spurious noise in the same manner when a second frequency signal is used. This is because the second frequency signal may need to be applied for less or more time than the first frequency signal before being changed. As such, this one-size-fits-all approach also introduces complications, such as cost and design complexities.

To address the shortcomings of such approaches, the disclosed techniques can help reduce or minimize the total number of clock signals used to vary the switching frequency of a switching regulator such as by controlling which of a plurality of clock signals is applied to the switching regulator, such as according to values of refresh rate control signals which are determined based on frequencies of their corresponding clock signals. For example, a first refresh rate control signal can be set to a first value based on a first of the plurality of clock signals and a second refresh rate control signal can be set to a second value based on a second of the plurality of clock signals. Depending on which of the plurality of clock signals is currently selected to be applied to the switching regulator, a different one of the refresh rate control signals is selected to control when a subsequent clock signal will be selected. In this way, rather than using a one-size-fits-all approach to control when the frequency of the switching regulator is changed or using a unmanageable number of clock signals, according to the disclosed techniques, each refresh rate control signal that controls when the frequency of the regulator changes has a value that is set based on the current clock signal being used by the switching regulator. In some implementations, only two clock signals and two refresh rate control signals are used to control switching of the switching regulator in a way that reduces spurious noise. By using different refresh rate control signals to control which clock signal is applied to the switching regulator and by setting the values of the refresh rate control signals based on the corresponding clock signal values, the described techniques efficiently, quickly, and at a minimal cost reduce the spurious noise that results from alternately opening and closing the switches of the switching regulator.

FIG. 1 is a block diagram of an example of a switching regulator system 100 in accordance with various embodiments. Switching regulator system 100 includes a switching regulator 130, clock signal selection circuitry 120 and refresh rate control circuitry 110.

Switching regulator 130 may be a current mode (CM) DC/DC switching power supply, also known as a current mode DC/DC converter. Many other converter configurations can also benefit from the present disclosure. The type of converter shown in FIG. 1 is a peak current mode converter.

During operation, a clock (Clk) signal is applied to the control logic of the switching regulator 130. The clock signal is one of a plurality of signals selected by the clock signal selection circuitry 120. The control logic may include an RS flip flop that generates a high signal at its Q output when the clock signal coupled to the set input of the RS flip flop is high. This, together with additional control logic, in response, turns the transistor switch s1 (the power switch) ON and turns the synchronous rectifier switch s2 OFF. In this way, the switch s1 is turned ON based on the frequency of the clock signal provided by the clock signal selection circuitry 120. Namely, the higher the frequency of the clock signal received by the control logic of the switching regulator 130, the more frequently the switch s1 will be turned ON. In the same way, for a lower frequency clock signal received by the control logic of the switching regulator 130, the switch s1 will be turned ON at a slower frequency. Both switches s1 and s2 may be MOSFETs or other transistors. A diode may replace the synchronous rectifier switch s2 in some implementations.

The input voltage Vin is applied to an inductor L1 through the switch s1 and causes a ramping current to flow through the inductor L1. This current flows through current sense circuitry and is also filtered by an output capacitor and is supplied current to a load coupled to the output of the switching regulator 130.

The output voltage Vout is applied to a voltage divider 141, and the divided voltage is applied to the negative input of a transconductance error amplifier 142. A reference voltage Vref is applied to the positive input of the amplifier 142. The output current of the amplifier 142 corresponds to the difference between the actual output voltage Vout and the desired output voltage. The voltage across a capacitor 143 at the output of the amplifier 142 is adjusted up or down based on the positive or negative current output of the amplifier 142. Such a voltage is referred to as a control voltage Vcomp.

The control voltage Vcomp is applied to a pulse width modulation (PWM) comparator 144 (also known as a current comparator). The ramping voltage across the current sense circuitry, when the switch s1 is ON, is sensed by a differential amplifier, in the current sense circuitry, having a certain gain, and, when the output of the amplifier in the current sense circuitry exceeds the control voltage Vcomp, the PWM comparator 144 is triggered to output a signal to the control logic of the switching regulator 130. In an implementation, a slope compensation device 132 is coupled to offset the output of the amplifier in the current sense circuitry by adding a voltage offset vslope 133 at the output of the slope compensation device 132 with the voltage output by the differential amplifier in the current sense circuitry. This added voltage is input to the PWM comparator 144 to be compared with the Vcomp voltage of amplifier 142 to trigger the control logic of the switching regulator 130.

The signal received by the control logic of the switching regulator 130 from the PWM comparator 144 is logically combined with the clock signal received from the clock signal selection circuitry 120 to turn the switch s1 ON or OFF. In an embodiment, the signal output by the PWM comparator 144 is coupled to a reset input of an RS flip flop to cause the output of the RS flip flop to be reset, which in turn causes the switch s1 to turn OFF. When the switch s1 turns OFF, the synchronous rectifier switch s2 turns ON to discharge the inductor L1, causing a downward ramping current. In this way, the peak current through the inductor L1 for each cycle is regulated to provide the required average current to maintain a regulated output voltage Vout.

The voltage at the capacitor 143, in conjunction with the inductor ramping current, an output of PWM comparator 144 (e.g., a pulse width modulation compensator amplifier), and the clock signal provided by the clock signal selection circuitry 120, sets the duty cycle of the switch s1, and the level of the voltage that is needed to equalize the inputs into the amplifier 142.

In some embodiments, the clock signal selection circuitry 120 receives a plurality of clock signals each at a different frequency (e.g., clk1, clk2, clkn). The clock signal selection circuitry 120 selects a given one of the plurality of clock signals based on a control signal 112 received from the refresh rate control circuitry 110. In some implementations, the clock signal selection circuitry 120 receives two clock signals clk1 and clk2 and selects to output either clk1 or clk2 based on the control signal. The given one of the plurality of clock signals that is selected by the clock signal selection circuitry 120 is output as clk_out signal 122. The clk_out signal 122 is provided to the control logic of the switching regulator 130 to control the switching operations of switches s1 and s2 and is provided to the refresh rate control circuitry 110 to control generation of the refresh rate control signals. Various implementations for generating the refresh rate control signals of the refresh rate control circuitry 110 to generate the control signal 112 are discussed below in connection with FIG. 24.

In one example, the clock signal selection circuitry 120 includes a multiplexor. The multiplexor may include a number of inputs coupled to receive respective ones of the plurality of clock signals. The multiplexor may include a select input control signal that logically routes a given one of the clock signals from a selected input to the output of the multiplexor. The select input control signal of the multiplexor may be coupled to the control signal 112 output by the refresh rate control circuitry 110. The output of the multiplexor may be provided as the clk_out signal 122.

In some embodiments, the control signal 112 output by the refresh rate control circuitry 110 selects which clock signal the clock signal selection circuitry 120 outputs to the switching regulator 130 in order to vary the switching frequency of the switching regulator 130. For example, the refresh rate control circuitry 110 may include a plurality of refresh rate control signals. Each refresh rate control signal is associated with a different value that triggers a change in the control signal 112. The value of each refresh rate control signal is determined based on the frequency of the respective one of the plurality of clock signals, received by the clock signal selection circuitry 120, corresponding to the refresh rate control signal. In this way, the rate at which the clock signal selection circuitry 120 changes which clock signal is selected to be output to the switching regulator 130 depends on the frequency of the currently selected clock.

For example, the clock signal selection circuitry 120 may receive first and second clock signals with respective first and second frequencies. In such circumstances, the refresh rate control circuitry 110 may include first and second refresh rate control signals that correspond respectively to the first and second clock signals. A first value of the first refresh rate control signal may be based on the first frequency and a second value of the second refresh rate control signal may be based on the second frequency. When the first clock signal is initially selected to be output by the clock signal selection circuitry 120 as the clk_out signal 122, the refresh rate control circuitry 110 adjusts the control signal 112 based on the first refresh rate control signal.

When the first refresh rate control signal reaches the first value, the refresh rate control circuitry 110 adjusts the value of the control signal 112 to change which clock signal the clock signal selection circuitry 120 selects to output as the clk_out signal 122. For example, the control signal 112 may change from controlling the clock signal selection circuitry 120 to output the first clock signal to subsequently output the second clock signal. When the second clock signal is subsequently selected to be output by the clock signal selection circuitry 120 as the clk_signal 122, the refresh rate control circuitry 110 adjusts the control signal 112 based on the second refresh rate control signal. When the second refresh rate control signal reaches the second value (which may be greater than the first value), the refresh rate control circuitry 110 operates to adjust the value of the control signal 112 to change which clock signal the clock signal selection circuitry 120 selects to output.

In one implementation, the control signal 112 is a particular bit (e.g., the most significant bit) or set of bits of a random or pseudorandom number generator and the refresh rate control circuitry 110 adjusts the value of the control signal 112 by instructing the random or pseudorandom number generator to output a new random or pseudorandom number when a selected refresh rate control signal reaches a corresponding value. The number of bits of the control signal 112 that are used from the random or pseudorandom number generated by the random or pseudorandom number generator may depend on the number of clock signals that the clock signal selection circuitry 120 receives and selects between. Specifically, if the number of bits of the random or pseudorandom number used is i (e.g., the number of bits of the control signal 112) then the number of frequencies or clock signals n that are selectable by the clock signal selection circuitry 120 is n<=2^i.

The control signal 112 may also be provided to the slope compensation device 132 to control an amount of voltage offset vslope 133 that is applied to the voltage output by the current sense circuitry of the switching regulator 130. In some implementations, the amount of voltage offset vslope 133 that is output by the slope compensation device 132 corresponds to the frequency of the selected clock signal. Specifically, each clock signal that is received by the clock signal selection circuitry 120 may have an associated voltage offset value generated by the slope compensation device 132. In this way, as the switching frequency of the switching regulator 130 is varied using the control signal 112, the amount of voltage offset vslope 133 also varies. Various implementations of the slope compensation device 132 are discussed below in connection with FIG. 5.

Figure 2:
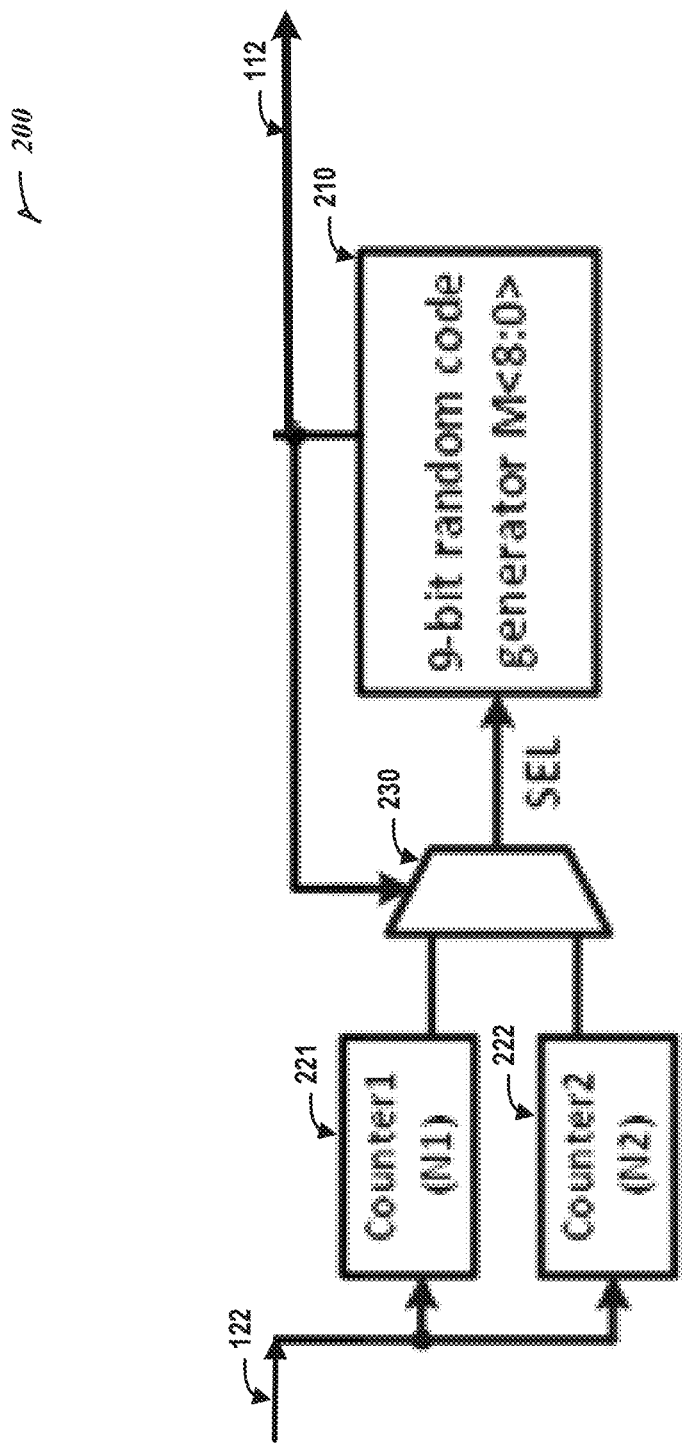
FIGS. 2-4 are block diagrams of examples of control circuitry that generates control signals for varying the frequency of the switching regulator in accordance with various embodiments.
Figure 3:
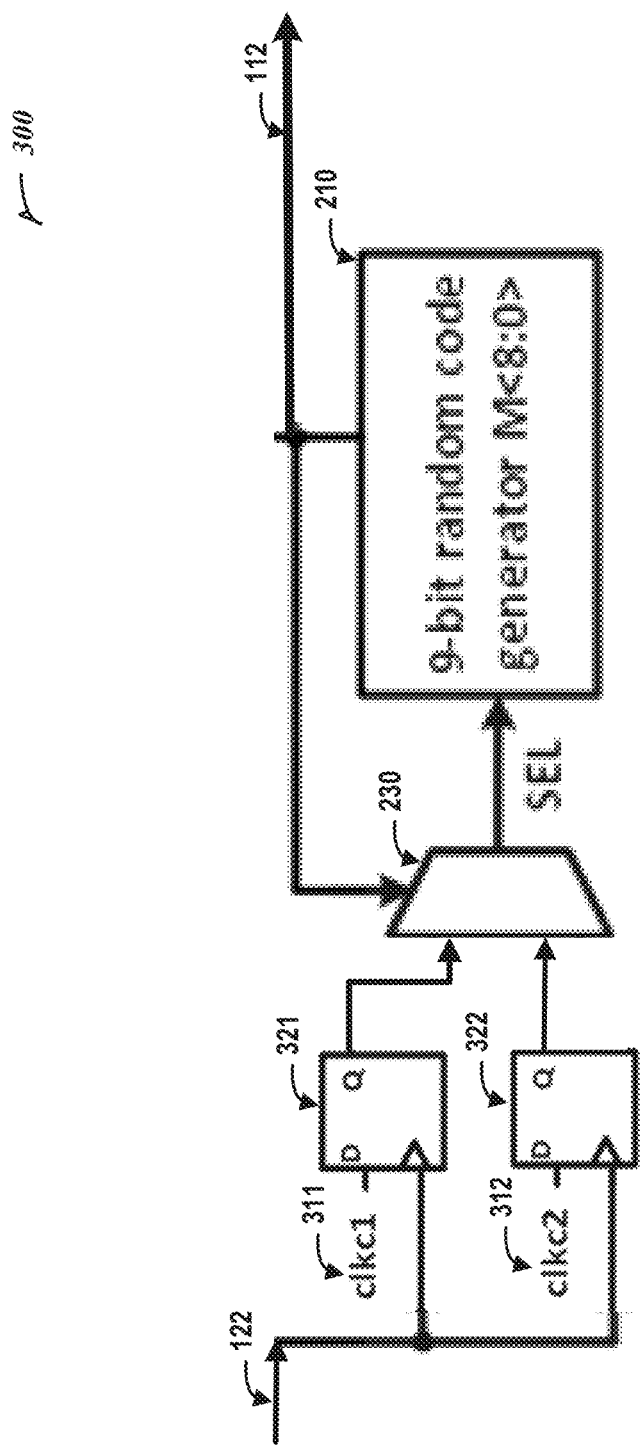
Figure 4:
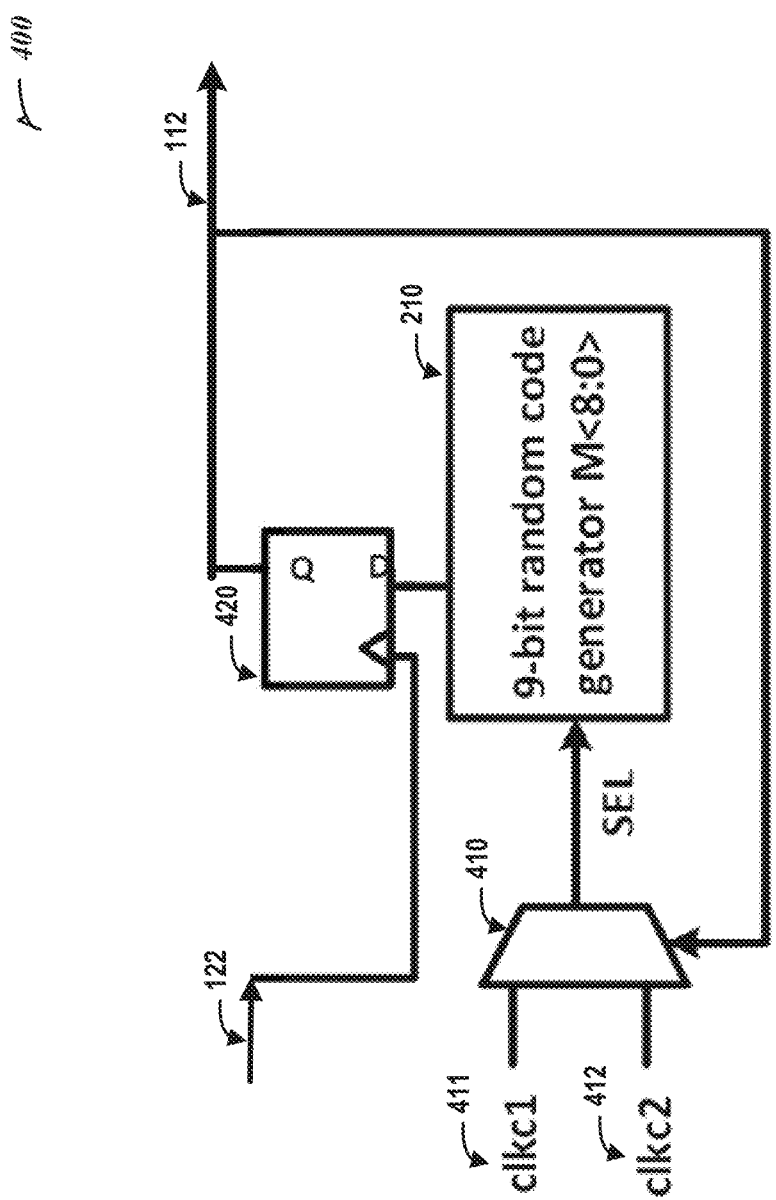

FIGS. 2-4 are block diagrams 200-400 of examples of control circuitry that generates control signals for varying the frequency of the switching regulator in accordance with various embodiments. Each control circuitry shown in FIGS. 2-4 represents a different implementation of refresh rate control circuitry 110. The control circuitry examples shown and described in connection with FIGS. 2-4 pertain to controlling selection of clock signal selection circuitry 120 between two clock signals but any number of additional clock signals can be similarly controlled.

In one implementation, refresh rate control circuitry 110, shown in diagram 200, includes a plurality of counters 221 and 222 and a random or pseudorandom code generator 210. The number of counters in this implementation may correspond to the total number of available clock signals that clock signal selection circuitry 120 selects between. For example, clock signal selection circuitry 120 may select between two clock signals having two different frequencies. In this case, refresh rate control circuitry 110 includes a first counter 221 and a second counter 222. Each counter 221 and 222 of the refresh rate control circuitry 110 may be associated with a respective one of the clock signals that the clock signal selection circuitry 120 receives. The counters 221 and 222 increment or decrement a current count value in accordance with the clk_out signal 122 output by the clock signal selection circuitry 120.

In one implementation, when the first counter 221 reaches a given value (e.g., a maximum count value), the first counter 221 outputs a first refresh rate control signal to a selection circuit 230 (e.g., a multiplexor). For example, the first refresh rate control signal may transition from a logic low state to a logic high state for one or more cycles of the clock signal selected by the clock signal selection circuitry 120. When the second counter 222 reaches a given value (e.g., a maximum count value) which is different from the value of the first counter 221, the second counter 222 outputs a second refresh rate control signal to the selection circuit 230 (e.g., a multiplexor). The selection circuit 230 receives a control signal 112 which may be the same as the control signal that controls selection of the clock signal selection circuitry 120. The selection circuit 230 is configured to select to output to the random or pseudorandom code generator 210 one of the refresh rate control signals that corresponds to the clock signal currently selected by the clock signal selection circuitry 120. In this way, although both counters 221 and 222 are synchronized to count based on the same clock signal, they each output a different refresh rate control signal to control the random or pseudorandom code generator 210 because they have different maximum count values.

For example, when the control signal 112 controls the clock signal selection circuitry 120 to output the first clock signal as the clk_out signal 122, the selection circuit 230 selects to output to the random or pseudorandom code generator 210 the first refresh rate control signal received from the first counter 221 that corresponds to the first clock signal. When the control signal 112 subsequently controls the clock signal selection circuitry 120 to output the second clock signal as the clk_out signal 122, the selection circuit 230 selects to output the second refresh rate control signal received from the second counter 222 that corresponds to the second clock signal. In this way, the counter that corresponds to the clock signal currently used to operate the switching regulator 130 is used to trigger the random or pseudorandom code generator 210 to generate a new value.

The random or pseudorandom code generator 210 is configured to detect a transition of the signal received from the selection circuit 230 from a logic low state to a logic high state. In response to detecting this transition, the random or pseudorandom code generator 210 generates a new random or pseudorandom number having a predetermined number of bits (e.g., 9-bits). One or more of the bits of the random or pseudorandom number is then provided as the control signal 112 to adjust the selection of the clock signal made by the clock signal selection circuitry 120. In this way, the refresh rate control circuitry 110 is configured to vary the switching frequency of the switching regulator 130 when the counter corresponding to the currently selected clock signal provided to the switching regulator 130 reaches a given value. A given value (e.g., the maximum count value) of the second counter 222 may be the same as or different from a given value (e.g., the maximum count value) of the first counter 221. The second counter 222 is independent of the first counter 221 and depending on the application performance can be improved based on the given values set for the first and second counters 221 and 22. Specifically, the first counter 221 having a maximum count value of N1 is configured to refresh the frequency of the clock applied to the switching regulator 130 (e.g., by triggering a new selection to be made by the clock signal selection circuitry 120) at a rate of f1/N1, where f1 is the frequency of the first clock signal received by the clock signal selection circuitry 120. Similarly, the second counter 222 having a maximum count value of N2 is configured to refresh the frequency of the clock applied to the switching regulator 130 (e.g., by triggering a new selection to be made by the clock signal selection circuitry 120) at a rate of f2/N2, where f2 is the frequency of the second clock signal received by the clock signal selection circuitry 120. It should be noted that even if the first and second counters 221 and 222 are set to the same maximum count values, the refresh rate control signals can differ by applying different clock signals to the first and second counters 221 and 222.

In some implementations, each of the plurality of counters 221 and 222 may count up to a respective maximum value (N1, N2) or down from a maximum value (N1, N2) until zero based on the clk_out signal 122 selected by the clock signal selection circuitry 120. The maximum value (N1, N2) of each of the counters 221 and 222 may be determined and programmed into the respective counter based on the frequency of the corresponding clock signal. For example, the first counter 221 may correspond to the first clock signal input of the clock signal selection circuitry 120. The first clock signal may have a frequency of 3.2 MHz and the maximum value of the first counter 221 may be set to the value 6. The second counter 222 may correspond to the second clock signal input of the clock signal selection circuitry 120. The second clock signal may have a frequency of 4 MHz and the maximum value of the first counter 221 may be set to the value 8. The maximum value of the counters of the refresh rate control circuitry 110 may be proportional to the frequency of the clock signals input to the clock signal selection circuitry 120 and/or may be inversely proportional. Specifically, the maximum value of the counters may be greater for larger frequency clock signals and/or may be lower as the frequency of the clock signals increases.

In some embodiments, the maximum count values of the counters 221 and 222 may be computed in accordance with the following equation:

$$|F_{clk\_out}(\omega)| \propto \frac{1}{\sqrt{N_1 N_2}\,\omega}\left(\tan\frac{\pi}{2}\frac{\omega}{\omega_1} - \tan\frac{\pi}{2}\frac{\omega}{\omega_2}\right)$$

where $\omega$ represents a potential peak point frequency, $\omega_1$ and $\omega_2$ represent the frequencies of the first and second clock signals that the selection circuitry 120 selects between, and $N_1$, $N_2$ represent the maximum count values of the first and second counters 221 and 222, respectively. The optimal values for $N_1$, $N_2$ may be computed by minimizing the potential spectrum peak point of each of the first and second clock signals ($f_1$ and $f_2$), which can be expressed as:

$$f_1 + \left[\frac{N_1 \Delta f}{f_1}\right]\frac{f_1}{N_1}$$

$$f_1 + \left[\frac{N_1 \Delta f}{f_1} + 1\right]\frac{f_1}{N_1}$$

$$f_2 - \left[\frac{N_2 \Delta f}{f_2}\right]\frac{f_2}{N_2}$$

$$f_2 - \left[\frac{N_2 \Delta f}{f_2} + 1\right]\frac{f_2}{N_1}$$

where $\Delta f$ represents the difference between $f_1$ and $f_2$.

FIG. 3 shows another implementation of refresh rate control circuitry 110 shown in diagram 300. In this implementation, rather than using counters to generate the refresh rate control signals, the refresh rate control circuitry 110 uses logic storage elements (e.g., flip flops). Specifically, refresh rate control circuitry 110 may include a plurality of logic storage elements 321 and 322, the selection circuit 230, and the random or pseudorandom code generator 210. The number of logic storage elements in this implementation may correspond to the total number of available clock signals that clock signal selection circuitry 120 selects between. For example, clock signal selection circuitry 120 may select between two clock signals having two different frequencies. In this case, refresh rate control circuitry 110 includes a first logic storage element 321 and a second logic storage element 322. Each logic storage element 321 and 322 of the refresh rate control circuitry 110 may be associated with a respective one of the clock signals that the clock signal selection circuitry 120 receives. The logic storage elements 321 and 322 store a value of a respectively received clock signal clkc1 311, clkc2 312. In accordance with the clk_out signal 122 output by the clock signal selection circuitry 120.

In an implementation, the frequencies of the clock signals clkc1 311, clkc2 312 may be different from the frequencies of the clock signals selected by the clock signal selection circuitry 120. Because the frequencies of the clock signals clkc1 311, clkc2 312 are different from the frequencies of the clk_out signal 122 received from the clock signal selection circuitry 120, each logic storage element 321 and 322 effectively implements a fractional counter.

In one implementation, when the clock signal clkc1 311 received by the input of the first logic storage element 321 is a logic high value when the rising edge of the clk_out signal 122 received from the clock signal selection circuitry 120 transitions from a logic low to a logic high state, the first logic storage element 321 outputs a first refresh rate control signal to a selection circuit 230 (e.g., a multiplexor). Similarly, when the clock signal clkc2 312 received by the input of the second logic storage element 322 is a logic high value when the rising edge of the clk_out signal 122 received from the clock signal selection circuitry 120 transitions from a logic low to a logic high state, the second logic storage element 322 outputs a second refresh rate control signal to the selection circuit 230 (e.g., a multiplexor). The selection circuit 230 receives a control signal 112 which may be the same as the control signal that controls selection of the clock signal selection circuitry 120. The selection circuit 230 is configured to select to output to the random or pseudorandom code generator 210 one of the refresh rate control signals that corresponds to the clock signal currently selected by the clock signal selection circuitry 120. In this way, although both logic storage elements 321 and 322 are synchronized to store and output the value of their respectively received input clkc1 321 and clkc2 312 based on the rising edge of the same clock signal (e.g., logic storage elements 321 and 322 change their output at the rising edge of the clk_out signal), they each output a different refresh rate control signal to control the random or pseudorandom code generator 210 because they receive clock signals clkc1 321 and clkc2 312 at their inputs with different frequencies. In some implementations, clock signals clkc1 321 and clkc2 312 may have the same frequency but may be inverted relative to one another such that clkc1 321 is 180 degrees out of phase with respect to clkc2 312.

For example, when the control signal 112 controls the clock signal selection circuitry 120 to output the first clock signal as the clk_out signal 122, the selection circuit 230 selects to output to the random or pseudorandom code generator 210 the first refresh rate control signal received from the first logic storage element 321 that corresponds to the first clock signal. When the control signal 112 subsequently controls the clock signal selection circuitry 120 to output the second clock signal as the clk_out signal 122, the selection circuit 230 selects to output the second refresh rate control signal received from the second logic storage element 322 that corresponds to the second clock signal. In this way, the logic storage element that corresponds to the clock signal currently used to operate the switching regulator 130 is used to trigger the random or pseudorandom code generator 210 to generate a new value.

The logic storage elements 321 and 322 may be similarly implemented and configured to output the value of the respectively received clock signals clkc1 321 and clkc2 312 at the falling edge of the clk_out signal 122 (e.g., when the clk_out signal 122 transitions from a logic high state to a logic low state). The frequencies of the clkc1 311 and clkc2 312 signals of the refresh rate control circuitry 110 may be proportional to the frequency of the clock signals input to the clock signal selection circuitry 120 and/or may be inversely proportional. Specifically, the frequencies of clkc1 311 and clkc2 312 may be greater for larger frequency clock signals input to the clock signal selection circuitry 120 and/or may be lower as the frequency of the clock signals input to the clock signal selection circuitry 120 increases.

According to the implementation shown in FIG. 3, the first logic storage element 321 is configured to refresh the frequency of the clock applied to the switching regulator 130 (e.g., by triggering a new selection to be made by the clock signal selection circuitry 120) at a rate of the frequency of the clock signal clkc1 311. Similarly, the second logic storage element 322 is configured to refresh the frequency of the clock applied to the switching regulator 130 (e.g., by triggering a new selection to be made by the clock signal selection circuitry 120) at a rate of the frequency of the clock signal clkc2 312.

FIG. 4 shows another implementation of refresh rate control circuitry 110 shown in diagram 400. In this implementation, rather than using counters to generate the refresh rate control signals as in diagram 200 or multiple storage elements as in diagram 300, the refresh rate control circuitry 110 uses one logic storage element (e.g., flip flop). Specifically, refresh rate control circuitry 110 may include a logic storage element 420, a refresh rate control signal selection circuit 410, and the random or pseudorandom code generator 210. The logic storage element 420 stores a value of one or more bits of the random or pseudorandom number generated by the generator 210 in accordance with the clk_out signal 122 output by the clock signal selection circuitry 120.

Specifically, in this implementation, a plurality of clock signals 411 and 412 may be received by the refresh rate control signal selection circuit 410. Each of the plurality of clock signals 411 and 412 may have a different frequency that is set based on the frequency of a corresponding one of the clock signals received by the clock signal selection circuitry 120. The clock signal that is selected by the refresh rate control signal selection circuit 410 may correspond to the clock signal that is selected by the clock signal selection circuitry 120. Specifically, when the clock signal selection circuitry 120 selects the first clock signal based on the control signal 112, the refresh rate control signal selection circuit 410 selects a first clock signal clkc1 411 as a first refresh rate control signal. When the clock signal selection circuitry 120 selects the second clock signal based on the control signal 112, the refresh rate control signal selection circuit 410 selects a second clock signal clkc2 412 as a second refresh rate control signal.

The clock signal selected by the refresh rate control signal selection circuit 410 controls the random or pseudorandom code generator 210 to generate a new random or pseudorandom number. For example, when the first clock signal clkc1 411 is selected by the refresh rate control signal selection circuit 410, the random or pseudorandom code generator 210 generates a new random or pseudorandom number at the rising or falling edge of the first clock signal clkc1 411. When the second clock signal clkc2 412 is selected by the refresh rate control signal selection circuit 410, the random or pseudorandom code generator 210 generates a new random or pseudorandom number at the rising or falling edge of the second clock signal clkc2 412.

One or more bits of the number output by the random or pseudorandom code generator 210 is received by the logic storage element 420. In one implementation, all of the bits of the number output by the random or pseudorandom code generator 210 are received by the logic storage element 420. In this case, only a subset of bits (e.g., only the most significant bit) output by the logic storage element 420 is provided as the control signal 112. The number of bits in the subset provided as the control signal 112 may depend on the number of clock signals that are received and selected between by the clock signal selection circuitry 120. In another implementation, only a subset of bits (e.g., only the most significant bit) output by the random or pseudorandom code generator 210 is provided to the logic storage element 420. The number of bits in the subset provided to the logic storage element 420 may depend on the number of clock signals that are received and selected between by the clock signal selection circuitry 120. In this case, the entire output of the logic storage element 420 is provided as the control signal 112.

The logic storage element 420 receives the clk_out signal 122 output by the clock signal selection circuitry 120 and is configured to output the currently received output from the random or pseudorandom code generator 210 at the rising or falling edge of the clk_out signal 122 output by the clock signal selection circuitry 120. In this way, the rate at which the frequency of the switching regulator 130 is varied depends on the frequency of the clock signal selected by the selection circuit 410 and the frequency of the clk_out signal 122. Specifically, the random or pseudorandom code generator 210 generates a new random or pseudorandom number at a rate that is based on the frequency of the clock signal selected by the selection circuit 410, and this output of the random or pseudorandom code generator 210 is provided as the control signal 112, to vary the frequency of the switching regulator 130, at a rate based on the frequency of the clk_out signal 122.

Figure 5:
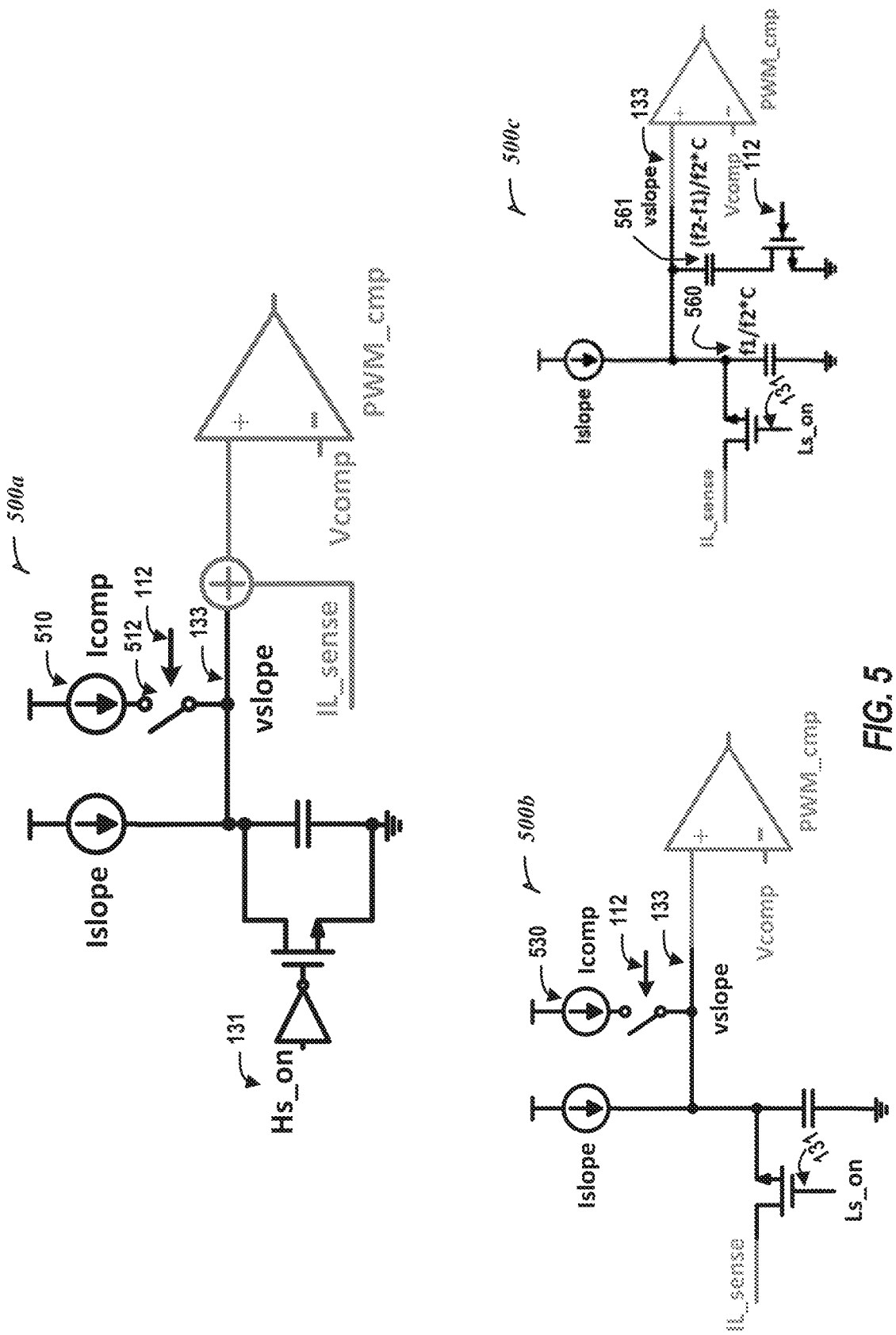
FIG. 5 shows block diagrams of examples of feedforward compensation circuitries in accordance with various embodiments.

FIG. 5 shows block diagrams 500a, 500b and 500c of examples of a slope compensation device 132 (e.g., feedforward compensation circuitry) in accordance with various embodiments. In one implementation, shown in diagram 500a, the slope compensation device 132 applies in a peak current mode and includes a first current source Islope and a second current source 510 Icomp. The slope compensation device 132 is coupled to receive a signal 131 (Hs_on) from the control logic of the switching regulator 130 indicating when the switch s1 is turned ON. When the signal 131 indicates that the switch s1 is turned ON, the slope compensation device 132 activates a transistor or switch to prevent feedforward compensation currents from the first and second current sources from being applied to the PWM_comp amplifier 144. Alternatively, when the signal 131 indicates that the switch s1 is turned OFF, the slope compensation device 132 deactivates the transistor or switch to cause feedforward compensation currents from the first and second current sources to be applied to the PWM_comp amplifier 144.

Depending on which clock signal the clock signal selection circuitry 120 currently selects to provide as the clk_out signal 122, the slope compensation device 132 applies the current from the second current source 510. For example, when the first clock signal is selected by the clock signal selection circuitry 120 to be applied to the switching regulator 130, the slope compensation device 132 opens a switch 512 that prevents the current from the second current source 510 from being combined and applied together with the first current source to PWM_comp amplifier 144. When the second clock signal (which may have a higher frequency than the first clock signal) is selected by the clock signal selection circuitry 120 to be applied to the switching regulator 130, the slope compensation device 132 closes a switch 512 that causes the current from the second current source 510 to be combined and applied together with the first current source to PWM_comp amplifier 144. In an embodiment, the switch 512 is controlled by the same control signal 112 that controls which clock signal the clock signal selection circuitry 120 selects.

The value for the second current source 510 Icomp may be computed in accordance with the following equation:

$$I_{comp} = \frac{f_2 - f_1}{f_1} I_{slope} + k \frac{f_2 - f_1}{f_1} \frac{V_{in} - V_{out}}{L}$$

where k is the resistance Ri of the current sensing circuitry, $f_1$ and $f_2$ correspond to the frequencies of the clock signals that the clock signal selection circuitry 120 can select, $V_{in}$ is the input voltage of the switching regulator 130, $V_{out}$ is the output voltage of the switching regulator 130, and L is the inductance of the inductor L1 of the switching regulator 130.

In some embodiments, when more than two clock signals are input to the clock signal selection circuitry 120 for selection and application to the switching regulator 130, there may be multiple second current sources 510 coupled to respective ones of a plurality of switches 512. Each of the multiple second current sources 510 corresponds to a different one of the multiple clock signals input to the clock signal selection circuitry 120. In this case, none of the multiple second current sources 510 may be coupled to be combined with the first current source Islope when a first clock signal that is selected is the slowest of clock by maintaining the respective switches in the open states. A first of the multiple second current sources 510 may be coupled to be combined with the first current source Islope when a second clock signal is selected while the remaining ones (e.g., second and third of the multiple current sources 510) are prevented from being combined by maintaining their respective switches in the open state. Multiple second current sources 510 may be coupled to be combined with the first current source Islope when a third clock signal is selected while the remaining ones (e.g., first and third of the multiple current sources 510) are prevented from being combined by maintaining their respective switches in the open state. A third of the multiple second current sources 510 may be coupled to be combined with the first current source Islope when a fourth clock signal is selected while the remaining ones (e.g., first and second of the multiple second current sources 510) are prevented from being combined by maintaining their respective switches in the open state. The value of each of the multiple second current sources 510 can be computed and set in a similar manner as discussed above for $I_{comp}$ where $f_1$ represents the slowest frequency of the multiple clock signals and $f_2$ represents the frequency of the clock signal corresponding to the given current source.

In another implementation, shown in diagram 500b, the slope compensation device 132 applies in an emulated current mode and includes the first current source Islope and a second current source 530 Icomp. The slope compensation device 132 is coupled to receive a signal 131 (Ls_on) from the control logic of the switching regulator 130 indicating when the switch s2 is turned ON. When the signal 131 indicates that the switch s2 is turned ON, the slope compensation device 132 activates a transistor or switch to apply feedforward compensation currents from the first and second current sources. The slope compensation device 132 shown in diagram 500b operates in a similar manner as that shown in diagram 500a except that it combines the current from the first and second current sources with the current IL_sense when the switch s2 is turned ON rather than when the switch s1 is turned ON. In this implementation, the value for the second current source 530 Icomp may be computed in accordance with the following equation:

$$I_{comp} = \frac{f_2 - f_1}{f_1} I_{slope}$$

where $f_1$ and $f_2$ correspond to the frequencies of the clock signals that the clock signal selection circuitry 120 can select.

In another implementation, shown in diagram 500c, the slope compensation device 132 applies in an emulated current mode. The slope compensation device shown in diagram 500c includes a first capacitor 560 and a second capacitor 561. The slope compensation device 132 shown in diagram 500c operates in a similar manner as that shown in diagram 500a except that it controls charging and discharging the first and second capacitors 560 and 561 based on the first current source Islope when the switch s2 is turned ON rather than when the switch s1 is turned ON.

The first capacitor 560 may be the same as the capacitor shown in diagrams 500a and 500b and may have a value that is set based on the value of the selected frequency signal. Rather than adding current to the first current source islope using the second current source 530 Icomp, like the implementation shown in diagram 500b, the value of the current received by the PWM_cmp from the first current source is controlled using the second capacitor 561. Specifically, the second capacitor 561 is charged or discharged to control the value provided by the first current source Islope based on the control signal 112 that controls which clock signal the clock signal selection circuitry 120 selects. When the signal 131 indicates that the switch s2 is turned ON, the slope compensation device 132 activates a transistor or switch to apply feedforward compensation current from the first current source Islope. Depending on which clock signal is currently selected by control signal 112, the value of the current supplied by the first current source Islope is adjusted by the charging and discharging of the second capacitor 561 through a transistor coupled to the second capacitor 561.

For example, when the signal 131 indicates that the switch s2 is turned ON, the slope compensation device 132 activates a transistor or switch to apply feedforward compensation current from the first current source Islope. At this point, the first current source Islope, if the control signal 112 indicates that a first clock signal is selected, the first current source Islope charges only the first capacitor 560 to control the value of vslope until. If the control signal 112 indicates that a second clock signal is selected, the first current source Islope charges both the first capacitor 560 and the second capacitor 561 to control the value of vslope. Namely, the value of vslope 133 is a function of the charging and discharging and the voltages output by the first capacitor 560 alone or in combination with the second capacitor 561 based on which clock signal is currently being selected by control signal 112.

Figure 6:
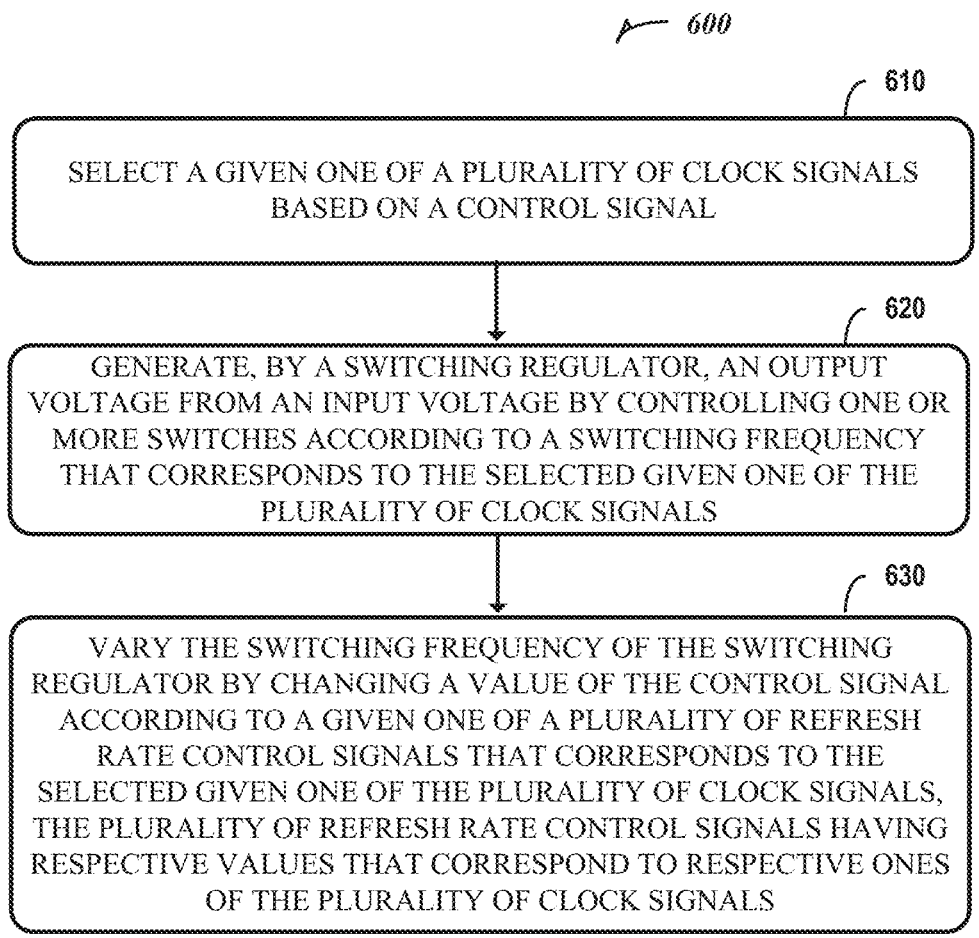
FIG. 6 is a flow diagram depicting example processes for controlling switching operations of a switching regulator in accordance with various embodiments.

FIG. 6 is a flow diagram depicting an example process 600 for controlling switching operations of a switching regulator in accordance with various embodiments. The operations of process 600 may be performed in parallel, in a different sequence, or may be entirely omitted. In some embodiments, some or all of the operations of process 600 may be embodied on a computer-readable medium and executed by one or more processors.

At operation 610, selection circuitry 120 selects a given one of a plurality of clock signals based on a control signal 112.

At operation 620, a switching regulator 130 generates an output voltage from an input voltage by controlling one or more switches s1 and s2 according to a switching frequency (e.g., clk_out signal 122) that corresponds to the selected given one of the plurality of clock signals.

At operation 630, control circuitry 110 varies the switching frequency of the switching regulator 130 by changing a value of the control signal 112 according to a given one of a plurality of refresh rate control signals that corresponds to the selected given one of the plurality of clock signals, the plurality of refresh rate control signals having respective values that correspond to respective ones of the plurality of clock signals.

Figure 7:
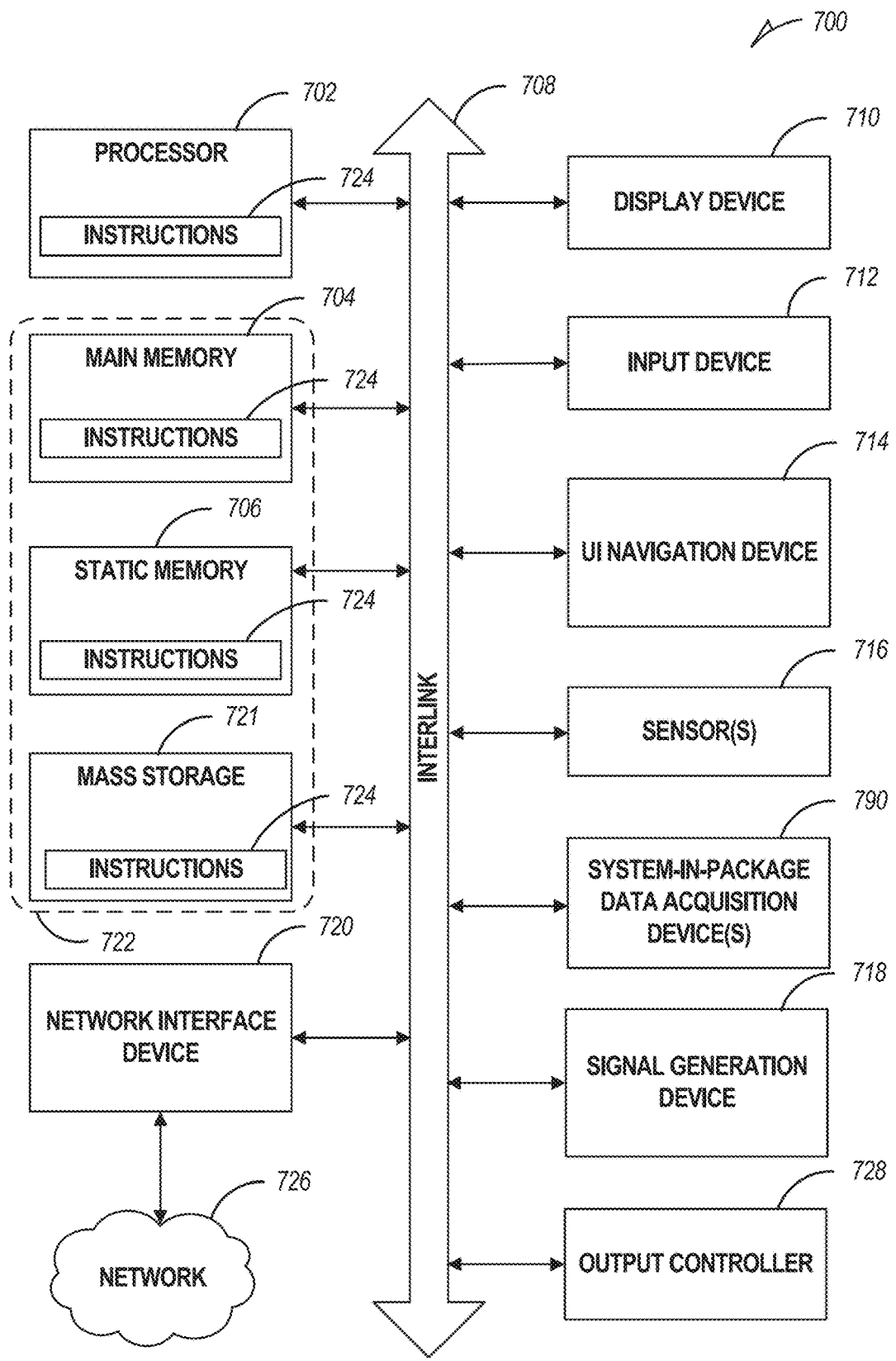
FIG. 7 is a block diagram illustrating an example of a machine upon one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 may include a hardware processor 702 (e.g., a central processing unit (CPU), a graphics processing unit (GPU), a hardware processor core, or any combination thereof, such as a memory controller, etc.), a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touchscreen display. The machine 700 may additionally include a storage device 722 (e.g., drive unit), a signal generation device 718 (e.g., a speaker), a network interface device 720, one or more sensors 716, such as a global positioning system (GPS) sensor, wing sensors, mechanical device sensors, temperature sensors, ICP sensors, bridge sensors, audio sensors, industrial sensors, compass, accelerometer, or other sensor, and one or more system-in-package data acquisition device(s) 790. System-in-package data acquisition device(s) 790 may implement some or all of the functionality of the switching regulator system 100. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 722 may include a machine-readable medium on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 721 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 724.

The term "machine readable medium" may include any transitory or non-transitory medium that is capable of storing, encoding, or carrying transitory or non-transitory instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data that are stored on the storage device 721 can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage device 721 is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding or carrying instructions for execution by the machine 700, and includes digital or analog communications signals or other tangible or intangible medium to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly language code, a higher-level language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A system for controlling switching operations of a switching regulator, the system comprising:
    clock signal selection circuitry configured to:
        concurrently receive a plurality of clock signals that oscillate at different frequencies; and
        select a given one of the plurality of clock signals based on a control signal;
    the switching regulator configured to generate an output voltage from an input voltage by controlling one or more switches according to a switching frequency that corresponds to the selected given one of the plurality of clock signals; and
    control circuitry configured to vary the switching frequency of the switching regulator by changing a value of the control signal, used by the clock signal selection circuitry to select the given one of the plurality of clock signals, according to a given one of a plurality of refresh rate control signals having respective values that correspond to respective ones of the plurality of clock signals, wherein a first of the plurality of refresh rate control signals causes the clock signal selection circuitry to switch from a first of the plurality of clock signals to a second of the plurality of clock signals in response to the first of the plurality of refresh rate control signals reaching a first trigger value, and wherein a second of the plurality of refresh rate control signals causes the clock signal selection circuitry to switch from the first of the plurality of clock signals to the second of the plurality of clock signals in response to the second of the plurality of refresh rate control signals reaching a second trigger value.

2. The system of claim 1, wherein the control circuitry comprises a plurality of counters configured to generate respective ones of the plurality of refresh rate control signals based on respective maximum count values, wherein a first counter of the plurality of counters has a first maximum count value corresponding to a first of the plurality of clock signals, and wherein a second counter of the plurality of counters has a second maximum count value corresponding to a second of the plurality of clock signals.

3. The system of claim 2, wherein the plurality of counters is configured to receive the selected given one of the plurality of clock signals and increment or decrement count values based on the received selected given one of the plurality of clock signals.

4. The system of claim 3, wherein the control circuitry is configured to change the value of the control signal in response to determining that a given one of the plurality of counters has reached the maximum count value of the given one of the plurality of counters.

5. The system of claim 4 further comprising counter selection circuitry configured to select, based on the control signal, between outputs of the plurality of counters to generate the control signal based on the selected output, the outputs of the plurality of counters being indicative of the respective counter having reached the respective maximum count value.

6. The system of claim 2, wherein the control circuitry further comprises random number generator circuitry configured to generate a random or pseudorandom number in response to a selected one of the plurality of counters reaching the respective maximum count value.

7. The system of claim 6, wherein the random or pseudorandom number is represented by a plurality of bits, and wherein a most significant bit of the plurality of bits is provided to the clock signal selection circuitry as the control signal when the plurality of clock signals includes only two clock signals.

8. The system of claim 1 further comprising feedforward compensation circuitry coupled to the switching regulator, the feedforward compensation circuitry being configured to apply current compensation based on the control signal.

9. The system of claim 8, wherein a value of the current compensation is based on a first frequency of a slowest one of the plurality of clock signals and a second frequency of another one of the plurality of clock signals.

10. The system of claim 9, wherein the feedforward compensation circuitry is configured to apply the current compensation when the given one of the plurality of clock signals that is selected is the slowest one of the plurality of clock signals and prevent applying the current compensation when the given one of the plurality of clock signals that is selected is the another one of the plurality of clock signals.

11. The system of claim 8, wherein the feedforward compensation circuitry includes a number of current sources that corresponds to a number of clock signals in the plurality of clock signals.

12. The system of claim 1, wherein the clock signal selection circuitry comprises a multiplexer having a plurality of clock signal inputs each coupled to receive a respective one of the plurality of clock signals and a control input coupled to receive the control signal, wherein the clock signal selection circuitry outputs one of the plurality of clock signals as the selected given one of the plurality of clock signals based on the control signal received at the control input.

13. The system of claim 1, wherein the control circuitry comprises a plurality of logic storage elements coupled to another selection circuit, and wherein:
a first of the plurality of logic storage elements is configured to output to the another selection circuit a first value of the first of the plurality of refresh rate control signals at an edge of the given one of the plurality of clock signals;

a second of the plurality of logic storage elements is configured to output to the another selection circuit a second value of the second of the plurality of refresh rate control signals at the edge of the given one of the plurality of clock signals; and
the another selection circuit selects, as an output of the another selection circuit, between the first and second values based on the control signal, the control signal being generated based on the output of the another selection circuit.

14. The system of claim 13, wherein the control circuitry further comprises random number generator circuitry configured to generate a random or pseudorandom number based on the output of the another selection circuit, wherein the random or pseudorandom number is represented by a plurality of bits, and wherein a most significant bit of the plurality of bits is provided to the clock signal selection circuitry as the control signal.

15. The system of claim 1, wherein the control circuitry comprises a logic storage element, another selection circuit, and random number generator circuitry, and wherein:
the another selection circuit is configured to select, as an output of the another selection circuit based on the control signal, between the first and the second of the plurality of refresh rate control signals;
the output of the another selection circuit causes the random number generator circuitry to generate a random or pseudorandom number represented by a plurality of bits; and
the logic storage element is configured to receive a bit from the plurality of bits and output to the another selection circuit the received bit at an edge of the given one of the plurality of clock signals.

16. A method for controlling switching operations of a switching regulator, the method comprising: concurrently receiving a plurality of clock signals that oscillate at different frequencies; selecting a given one of the plurality of clock signals based on a control signal; generating, by the switching regulator, an output voltage from an input voltage by controlling one or more switches according to a switching frequency that corresponds to the selected given one of the plurality of clock signals; and varying the switching frequency of the switching regulator by changing a value of the control signal used to select the given one of the plurality of dock signals, according to a given one of a plurality of refresh rate control signals that corresponds to the selected given one of the plurality of dock signals having respective values that correspond to respective ones of the plurality of refresh rate control signals, wherein a first of the plurality of refresh rate control signals causes switching from a first of the plurality of clock signals to a second of the plurality of clock signals in response to the first of the plurality of refresh rate control signals reaching a first trigger value, and wherein a second of the plurality of refresh rate control signals causes switching from the first of the plurality of dock signals to the second of the plurality of dock signals in response to the second of the plurality of refresh rate control signals reaching a second trigger value.

17. The method of claim 16 further comprising generating respective ones of the plurality of refresh rate control signals based on respective maximum count values of a plurality of counters, wherein a first counter of the plurality of counters has a first maximum count value corresponding to a first of the plurality of clock signals, and wherein a second counter of the plurality of counters has a second maximum count value corresponding to a second of the plurality of clock signals.

18. The method of claim 16 further comprising applying current compensation based on the control signal, such that the current compensation is applied when the given one of the plurality of clock signals that is selected is a slowest one of the plurality of clock signals and is prevented from being applied when the given one of the plurality of clock signals that is selected is a different one of the plurality of clock signals.

19. An apparatus for controlling switching operations of a switching regulator, the apparatus comprising:
- means for concurrently receiving a plurality of clock signals that oscillate at different frequencies;
- means for selecting a given one of a plurality of clock signals based on a control signal;
- means for generating an output voltage from an input voltage by controlling one or more switches according to a switching frequency that corresponds to the selected given one of the plurality of clock signals; and
- means for varying the switching frequency of the switching regulator by changing a value of the control signal, used to select the given one of the plurality of clock signals, according to a given one of a plurality of refresh rate control signals that corresponds to the selected given one of the plurality of clock signals having respective values that correspond to respective ones of the plurality of refresh rate control signals, wherein a first of the plurality of refresh rate control signals causes switching from a first of the plurality of clock signals to a second of the plurality of clock signals in response to the first of the plurality of refresh rate control signals reaching a first trigger value, and wherein a second of the plurality of refresh rate control signals causes switching from the first of the plurality of clock signals to the second of the plurality of clock signals in response to the second of the plurality of refresh rate control signals reaching a second trigger value.

20. The apparatus of claim 19 further comprising:
- means for generating respective ones of the plurality of refresh rate control signals based on respective maximum count values of a plurality of counters, wherein a first counter of the plurality of counters has a first maximum count value corresponding to a first of the plurality of clock signals, and wherein a second counter of the plurality of counters has a second maximum count value corresponding to a second of the plurality of clock signals; and
- means for applying current compensation based on the control signal, such that the current compensation is applied when the given one of the plurality of clock signals that is selected is a slowest one of the plurality of clock signals and is prevented from being applied when the given one of the plurality of clock signals that is selected is a different one of the plurality of clock signals.

* * * * *

UNITED STATES PATENT AND TRADEMARK OFFICE
CERTIFICATE OF CORRECTION

PATENT NO. : 11,056,976 B2  
APPLICATION NO. : 16/292113  
DATED : July 6, 2021  
INVENTOR(S) : Lu et al.

Page 1 of 1

It is certified that error appears in the above-identified patent and that said Letters Patent is hereby corrected as shown below:

In the Claims

In Column 22, Line 35, in Claim 16, after "comprising:", insert a linebreak

In Column 22, Line 37, in Claim 16, after "frequencies;", insert a linebreak

In Column 22, Line 38, in Claim 16, after "signal;", insert a linebreak

In Column 22, Line 42, in Claim 16, after "and", insert a linebreak

In Column 22, Line 45, in Claim 16, delete "dock" and insert --clock-- therefor

In Column 22, Line 47, in Claim 16, delete "dock" and insert --clock-- therefor

In Column 22, Line 56, in Claim 16, delete "dock" and insert --clock-- therefor

In Column 22, Line 56, in Claim 16, delete "of dock" and insert --of clock-- therefor Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*